United States Patent

[11] 3,625,530

| [72] | Inventor | Hubert J. Parsons<br>Horseheads, N.Y. |
|---|---|---|
| [21] | Appl. No. | 865,556 |
| [22] | Filed | Oct. 13, 1969 |
| [45] | Patented | Dec. 7, 1971 |
| [73] | Assignee | Hardinge Brothers, Inc.<br>Elmira, N.Y. |

[54] COLLET ACTUATING DEVICE
10 Claims, 2 Drawing Figs.

[52] U.S. Cl..................................... 279/4,
90/11 A, 279/53
[51] Int. Cl........................................ B23b 31/30
[50] Field of Search............................ 279/4;
90/11 A

[56] References Cited
UNITED STATES PATENTS
| 2,695,096 | 1954 | Gridley.................. | 279/4 X |
| 2,793,040 | 1957 | Wilson................... | 279/4 |
| 2,886,007 | 1959 | Manchester............. | 279/4 X |
| 3,177,775 | 1965 | Alisauskis............... | 90/11 A |

Primary Examiner—Andrew R. Juhasz
Assistant Examiner—James F. Coan
Attorney—Shlesinger, Arkwright & Garvey ABSTRACT: A collet actuating device including two concentrically arranged tubular members one of which is movable axially and annularly relative to the other; a Belleville spring connected to both of the tubular members for exerting pressure axially on each of the tubular members and in opposite directions for actuating a collet; a piston connected to one end of the Belleville spring for relieving pressure exerted by the spring on one of the tubular members; and a locking means for arresting movement of the tubular members annularly relative to each other.

COLLET ACTUATING DEVICE

This invention relates to devices for opening and closing collets or other chucking devices.

PRIOR ART DEVELOPMENTS

There are a number of devices which move a collet in order to close its jaws. A major problem with most of these devices is that considerable variation in chucking pressure results when workpieces to be gripped by the collet have a variation in diameter of over one or two thousandths of an inch. Prior art collet closers were able to be adjusted to adapt for operating on these different-sized workpieces. However, each time a workpiece with a different diameter was used, an adjustment had to be made. This resulted in much time loss.

Parsons, U.S. Pat. No. 3,077,353, Feb. 12, 1963, attempted to overcome these difficulties by providing a collet closer which is operable on workpieces with considerable variations in diameter. However, that invention comprised a complicated series of gears and utilized many moving parts. A pneumatically operated piston was disclosed in that invention to move the gears for both opening and closing the jaws of the collet. The arrangement of parts in that invention prevented in some cases the application of sufficient pressure to grip the workpiece. A large number of moving parts in that invention resulted in a high incidence of wear of those parts.

OBJECTS AND SUMMARY

It is therefore, an object of this invention to provide a collet-actuating mechanism which is operable on workpieces with considerable variations in diameter.

Another object of this invention is to provide a collet actuating device which can apply uniform chucking pressure on workpieces with considerable variations in diameter.

Still a further object of this invention is to provide a collet actuating device which can apply sufficient pressure so that workpieces are gripped without slippage.

A further object of this invention is to provide a collet actuating device which allows a collet to be inserted or removed from the device without any undue loss of time.

Still another object of this invention is to provide a collet actuating device that includes a relatively small number of moving parts.

Yet a further object of this invention is to provide a collet actuating device which includes a fine adjustment for controlling the jaws of a collet.

Still a further object of this invention is to provide a collet actuating device which utilizes a Belleville spring to exert pressure on a tubular drawing member for closing the jaws of a collet.

Yet another object of this invention is to provide a collet actuating device which utilizes a piston to relieve the pressure exerted by the Belleville spring on the tubular drawing member.

To summarize, it is therefore an object of this invention to provide a collet actuating device which applies a uniform pressure to workpieces with variable diameters, the pressure being greater than that exerted by prior art devices; engages and disengages a collet at a faster rate of speed than in such prior art devices; reduces the number of moving parts than in such prior art devices; and utilizes a Belleville spring to actuate a collet and a piston to relieve pressure exerted by the Belleville spring on a tubular member holding the collet.

These and other objects of this invention and advantages and capabilities will be apparent from the following description and appended claims and accompanying drawings in which:

FIGS. 1 AND 2

Figure 1:
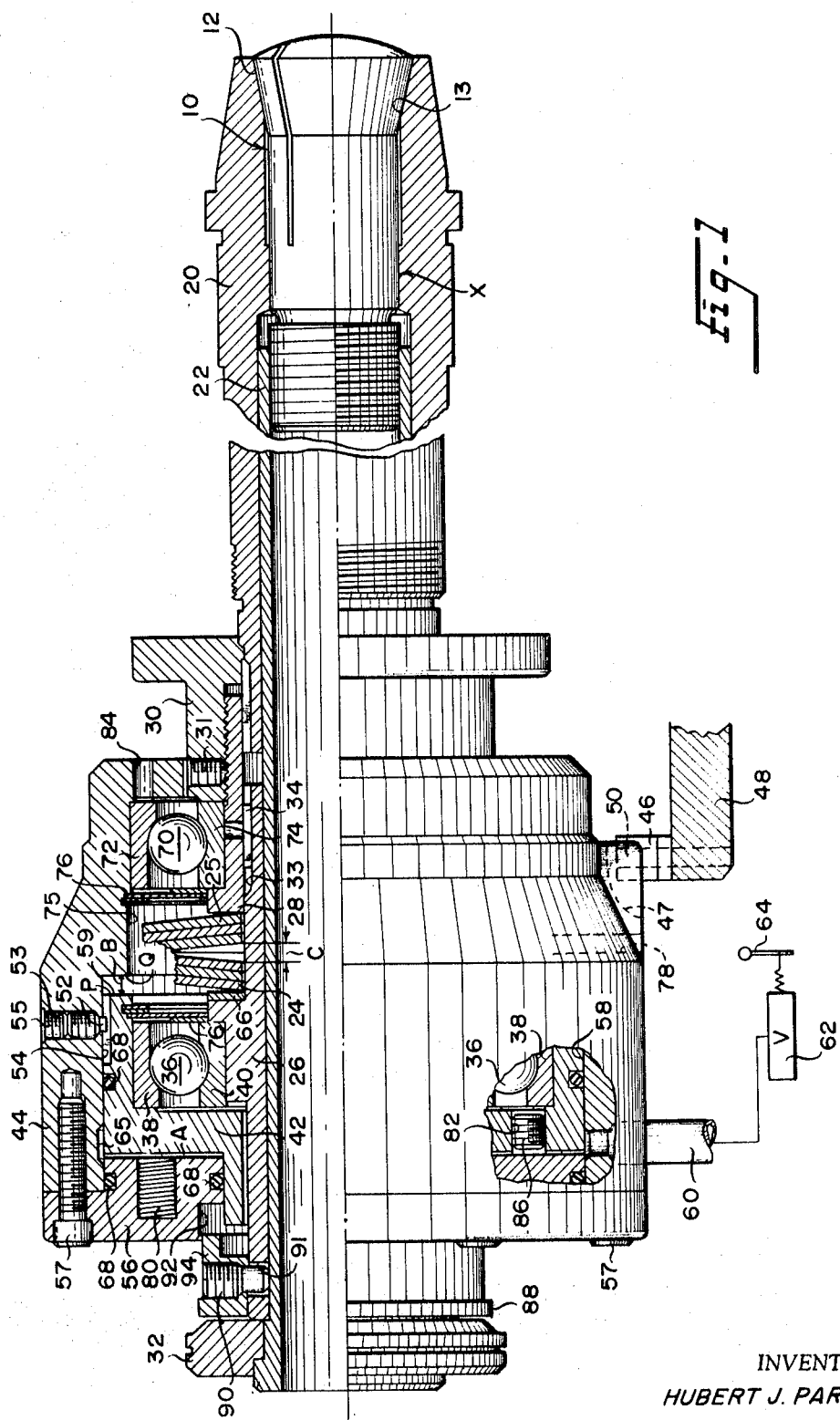
FIG. 1 is a front elevational view partly in section of a collet actuating device embodying this invention.
Figure 2:
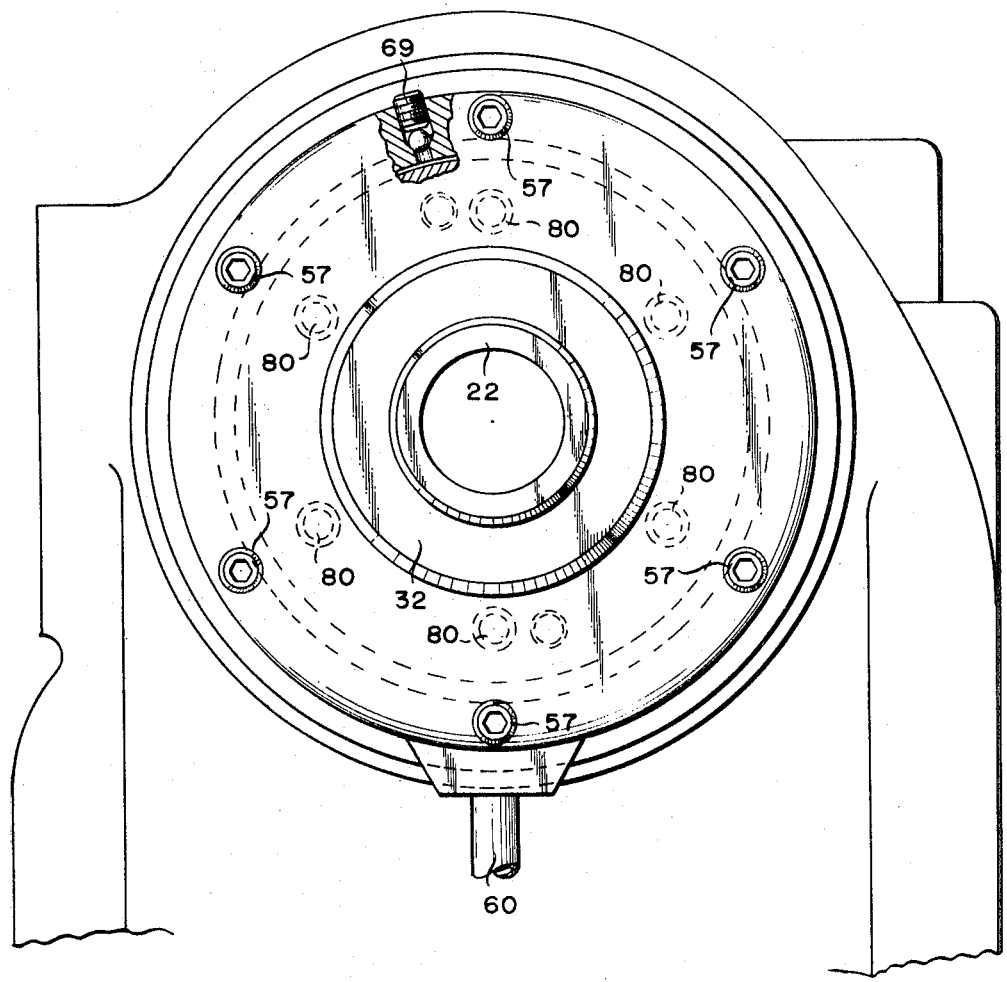
FIG. 2 is a left side elevational view of the collet actuating device.

The collet X used in this invention may be of any suitable type including spring fingers or jaws 10 having tapering external faces 12 which cooperate with an internal tapering face 13 provided in the lathe spindle 20. The collet X is threadedly connected with a tubular drawing member 22 that is movable in both ways lengthwise of its axis, such movement acting to move the collet jaws 10 into and out of gripping relationship with a workpiece (not shown). The workpiece is then rotated by the lathe spindle 20. In this arrangement shown, the jaws 10 of the collet X are moved into gripping position when the tubular drawing member 22 is moved to the left in FIG. 1. The collet X is released when the tubular drawing member 22 is moved to the right.

The tubular drawing member 22 is moved axially relative to the lathe spindle 20 by means of two Belleville springs 24 and 25 in opposed relationship to each other that are positioned between an annular member 26 and an abutment sleeve 28. An internally threaded collar 30 abuts the lathe spindle 20 and is stationary relative to the lathe spindle 20. The abutment sleeve 28 is threadedly engaged with the internally threaded collar 30, the two being held firm by means of screw 31, thereby causing the abutment sleeve 28 to be stationary relative to the lathe spindle 20. The Belleville springs 24 and 25 exert pressure axially on both the abutment sleeve 28 and the annular member 26 resulting in the annular member 26 being moved axially to the left in FIG. 1 relative to the lathe spindle 20. The annular member 26, when thus moved, engages an end collar 32, secured to the tubular drawing member 22, which acts to move the collet into work-gripping position. The annular member 26 is provided on its outer surface with a keyway 33 in which a key 34 fits and engages the abutment sleeve 28 to permit axial movement of the annular member 26 relative to the abutment sleeve 28, while preventing annular movement of one relative to the other.

When the annular member 26 is moved to the right to compress Belleville springs 24 and 25, the reverse operation takes place. Pressure exerted against the end collar 32 is thus released permitting movement of the tubular drawing member 22 into collet releasing position.

In this construction of the collet actuating device, a bearing means 36 including an outer race 38 and an inner race 40 is positioned so that the inner race 40 along its internal side and one edge abuts the annular member 26 so that pressure exerted on the opposite edge of the outer race 38 will act to compress the Belleville springs 24 and 25. The embodiment for exerting such pressure on bearing means 36 is by means of a circular piston member 42 movable parallel to the axis of the lathe spindle 20 and positioned in an annular cylinder member 44. The cylinder member 44 acts as a housing and is secured to the base (not shown) of the lathe by a key 46 which is inserted into a slot 47 on arm 48 which is attached to the base. A pin 50 that extends through the arm 48 engages the rubber bushing to hold the cylinder member 44 firmly stationary and prevent its rotation relative to the lathe spindle 20. The rubber bushing 46 dampens vibrations generated by high-speed rotation of the lathe spindle 20.

A key 52 is inserted in an opening 53 in the cylinder member 44 and engages the piston member 42. The point of engagement is an axial slot 54 in the piston member 42 which, while preventing annular motion of the piston member 42 relative to the cylinder member 44, permits axial movement of the piston member 42 relative to the cylinder member 44. A setscrew 55 is positioned above the key 52 in the opening for keeping the key 52 in a stationary position. 56 represents a cylinder head secured to one end of the cylinder member 44 by means of screws 57. The cylinder member 44 thus forms an annular chamber 58 therein and the piston member 42 has an annular projection 59 extending into the chamber 58.

Located within the annular chamber 58, within the annular projection 59 of the piston member 42, is bearing means 36. Oil or any other suitable hydraulic fluid may be admitted through tube 60 into space A between the cylinder head 56 and the piston member 42, the admission of oil being controlled by any suitable valve member 62 controlled by means of handle 64. An annular groove 65 is provided in cylinder member 44 for rapid dispersal of hydraulic fluid throughout space A. The admission of oil under pressure into space A acts to compress the Belleville springs 24 and 25 by movement to the right in FIG. 1 of piston member 42. Pressure is imparted, which results in the compression of the Belleville springs 24 and 25, through outer race 38, bearing 36, inner race 40, annular member 26, and spacer 66. It is obvious from the foregoing, that when pressure on the hydraulic fluid is released the Belleville springs 24 and 25 will act to move the piston member 42 back to the position from where it began. Sealing rings 68, such as O-rings, are provided between cylinder member 44 and cylinder head 56 and piston member 42 to form oiltight connections between those members. A suitable bleeding means 69 is located in cylinder member 44 for releasing air that may accumulate in A.

B represents the distance between the end P of annular projection 59 of piston member 42 and an inward projection Q of cylinder member 44. C represents the gap between the two opposite sides of the Belleville springs 24 and 25. B at any given time is slightly less than C to restrict the maximum movement of piston member 42 for reasons hereinafter set out.

In this embodiment of a collet actuating device a second bearing means 70 together with its outer race 72 and inner race 74 is positioned within cylinder member 44 and on the opposite side of Belleville springs 24 and 25 from bearing means 36. Grease for lubricating both bearings means 36 and 70 is prevented from entering the recess 75 within cylinder member 44 in which Belleville springs 24 and 25 are located by means of suitable bearing shields 76. At the bottom of cylinder member 44 is located a drain opening 78 for draining oil which may bypass the sealing rings 68.

Suitable coil spring means 80 is located within cylinder head 56 and abuts against piston means 42 while in a relaxed position for maintaining a constant minimum pressure on bearing means 36 and 70 to prevent them from chattering while the lathe is in operation. The restricted movement of piston member 42 prevents undue pressure from being exerted on bearings 36 and 70 located within housing 44.

Piston member 42 contains two drive holes 82°—180° apart—through which the races 38 and 40 of bearing means 36 can be removed. Similar drive holes 84 are located in the back of cylinder member 44 for removing the races 72 and 74 of bearing means 70. Suitable knockout plugs 86 are to be secured in drive holes 82 to prevent hydraulic oil from entering the area in which bearing means 36 is located.

A ring 88 is mounted in fixed relationship to the tubular drawing member 22 and is provided with two setscrews 90°—180° apart—having threaded engagement with the ring 88 and extending through two holes 91 in the annular member 26 into engagement with the tubular drawing member 22. This relationship is such that when the setscrews 90 are tightened the tubular drawing member 22 and the annular member 26 are connected. When the tubular drawing member 22 is turned to engage its screw threads with those of the collet X, the setscrews 90 are released from engagement with the tubular drawing member 22, so that the end collar 32 and the tubular drawing member 22 connected therewith can be rotated. This arrangement is also used when it is desired to adjust the collet X for cooperation with workpieces of different diameters. The setscrews 90 when tightened hold the tubular drawing member 22 in fixed relationship to the annular member 26. This gives a positive release to the collet X when piston member 42 and annular member 26 move to the right. This is important as collets often tend to stick in the lathe spindle 20 when it is in the closed position. The cylinder head 56 is provided with an axial slot 92 in which a flange 94 extending from the ring 88 can project.

OPERATION

From the foregoing, it is obvious that when oil is admitted to the cylinder, piston member 42 will move to the right in FIG. 1, compress the Belleville springs 24 and 25, and positively open the collet X. Pressure is imparted onto bearing means 36 which in turn acts to compress the Belleville springs 24 and 25. When pressure on the piston member 42 is relieved by evacuation of the oil and setscrews 90 are tightened thereby holding the tubular drawing member 22 in fixed relationship with annular member 26, pressure exerted by Belleville springs 24 and 25 acts to impart pressure on the spring fingers 10 of the collet thereby closing the collet X and firmly holding the workpiece in position.

By utilizing Belleville springs to impart this pressure, greater pressure is used to hold the workpiece than in collet actuating devices heretofore constructed. To allow for ease of adjustment end collar 32 is an adjustment knob which allows adjustment of the tubular drawing member 22 when pressure exerted by the Belleville spring 24 and 25 on the tubular drawing member 26 is relieved by actuating piston member 42. Simultaneous movement of many moving parts such as disclosed in Parsons, U.S. Pat. No. 3,077,353 of Feb. 12, 1963, is averted by utilizing Belleville springs and a piston as disclosed in this invention. The reduction of moving parts herein described allows for longer wear before replacement of parts is needed and, in the invention as disclosed, allows for faster adjustment of the collet actuating device for workpieces having variable diameters.

While the invention has been described in connection with the preferred embodiment, it will be understood that it is capable of further modification. This application is intended to cover any variations, uses, or adaptations of the invention following, as well as the principals of the invention in general including such departures from the present disclosure as come within known or customary practice in the art to which the invention pertains and further including such departures as may be applied to the essential features hereinbefore set forth and fall within the scope of the invention or the limits of the appended claims.

Having thus described my invention what I claim is:

1. A collet actuating device comprising:
   a. concentrically arranged tubular members one of which is movable axially and annularly relative to the other,
   b. means connected to both of said tubular members for moving one of said tubular members axially relative to the other and including spring means for exerting pressure axially on each of said tubular members and in opposite directions for moving a collet,
   c. piston and cylinder means connected to said moving means for relieving the pressure exerted by said spring means,
   d. bearing means for mounting said piston means about one of said tubular members,
   e. means for limiting the travel of said spring means to a first predetermined distance between compressed and relaxed positions,
   f. fluid pressure means for moving said piston means,
   g. means for limiting the travel of said piston means to a second predetermined distance,
   h. said first predetermined distance being greater than said second predetermined distance, thereby limiting the pressure exerted against said bearing means.

2. A collet actuating device as described in claim 1 and wherein:
   a. said spring means comprises a Belleville spring.

3. A collet actuating device as described in claim 2 and including:
   a. a plurality of said Belleville springs in opposed relationship to each other.

4. A collet actuating device as described in claim 3 and wherein:

a. each of said Belleville springs exerting pressure in a direction opposite to the other of said Belleville springs and axially on one of said tubular members.

5. A collet actuating device as described in claim 1 and including:
   a. a housing extending annularly about the axis of said tubular members;
   b. said housing including a locking part releasably locking said piston means to said housing for preventing said piston means from moving annularly relative to said housing; and
   c. said piston means including an axial slot in which said locking part fits when in a locking position for permitting said piston means to move axially relative to said housing while preventing said piston means from moving annularly relative to said housing.

6. A collet actuating device as described in claim 1 and including:
   a. said bearing means is positioned between said piston means and said spring means; and
   b. an annular member extending about one of said tubular members;
   c. a part of said annular member positioned between said bearing means and said spring means; and
   d. said annular member including a locking part releaseably locking said one of said tubular members to said annular member for preventing movement of said one of said tubular members relative to said annular member whereupon pressure exerted by said spring means upon said tubular members to move said one of said tubular members axially relative to the other is relieved when fluid under pressure is forced into said cylinder means between a wall of said cylinder means and said piston means causing said piston means to move axially towards said spring means and compress said spring means.

7. A collet actuating device as described in claim 6 and including:
   a. spring means positioned in the wall of said cylinder means for exerting pressure on said piston means and in turn exerting pressure on said bearing means when said fluid under pressure has been evacuated from said cylinder means so that a constant minimum pressure is maintained on said bearing means at all times.

8. A collet actuating device as described in claim 1 and including:
   a. said bearing means abuts said piston means; and
   b. said piston means including a flange on its outer annular edge extending axially towards and annularly about an outer race of said bearing means for supporting said bearing means in a recess formed by said flange.

9. A collet actuating device as described in claim 1 and including:
   a. a housing enclosing said piston means and said cylinder means extending annularly about the axis of said tubular members; and
   b. said housing including a drain hole for fluid which may escape from said cylinder means when said fluid is acting upon said piston means.

10. A collet actuating device as described in claim 1 and including:
   a. second bearing means having inner and outer races located on the other side of said spring means from said piston means;
   b. a housing extending annularly about the axis of said tubular members enclosing said bearing means; and
   c. means for disassembling said bearing means, including drive holes in said housing and knockout plugs in said drive holes.

* * * * *